United States Patent [19]

Cosper et al.

[11] 4,268,352
[45] May 19, 1981

[54] METHOD OF REDUCING SOLUBLE STARCH IN BROKE REPULPING USING A DUAL POLYMER COMBINATION

[75] Inventors: David R. Cosper, Downers Grove; Patricia R. Soll, Buffalo Grove, both of Ill.

[73] Assignee: Nalco Chemical Company, Oak Brook, Ill.

[21] Appl. No.: 44,669

[22] Filed: May 30, 1979

Related U.S. Application Data

[63] Continuation of Ser. No. 886,490, Mar. 14, 1978, abandoned.

[51] Int. Cl.³ .............................................. D21F 1/82
[52] U.S. Cl. ..................... 162/191; 162/164 EP; 162/168 NA
[58] Field of Search ............... 162/168 NA, 164 EP, 162/191; 210/52, 53, 540

[56] References Cited

U.S. PATENT DOCUMENTS

| | | | |
|---|---|---|---|
| 3,201,304 | 8/1965 | Monjat et al. | 162/168 NA |
| 3,323,979 | 6/1967 | Foster et al. | 162/168 NA |
| 3,790,476 | 2/1974 | Spoerle et al. | 210/540 |
| 3,907,758 | 9/1975 | Sackmann et al. | 162/168 NA |
| 4,029,885 | 6/1977 | Buikema | 427/391 |

Primary Examiner—William F. Smith
Attorney, Agent, or Firm—John G. Premo; Robert A. Miller; John S. Roberts, Jr.

[57] ABSTRACT

This invention is a method of increasing the amount of retention of deposited starch and pigment on fibers in broke liquid which consists of adding to said liquid a combination dosage of a DMA-epichlorohydrin polymer together with a second polymer consisting of acrylamide/acrylate. Such a polymer may be anionic, such as an acrylamide/sodium acrylate 5% or 30% acrylic acid, or it may be cationic, such as acrylamide/-dimethylamino ethyl methacrylate dimethyl sulfate quaternary. The polymers may be applied to the broke directly and preferably in the form of an inverted water-in-oil emulsion. The dosage based on dry weight of starch (T) ranges from 2–35 lbs/T of the DMA-epichlorohydrin polymer product (48% polymer, 0.96–16.8 lbs/T polymer) and 0.5–8 lbs/T based on the second polymer product (28% polymer, 0.14–2.24 lbs/T polymer) selected from the group consisting of copolymers of acrylamide/acrylic acid; copolymers of acrylamide/alkali metal acrylate (e.g., sodium acrylate); copolymers of acrylamide/dimethylamino ethyl methacrylate dimethyl sulfate quaternary (DMAEM.DMS quat).

6 Claims, No Drawings

METHOD OF REDUCING SOLUBLE STARCH IN BROKE REPULPING USING A DUAL POLYMER COMBINATION

This is a continuation of application Ser. No. 886,490, filed Mar. 14, 1978 abandoned.

In the pulp and paper making industry, a certain fraction of the paper products designed for commercial use never leaves the paper mill, some due to defects in the dry or wet end wherein small particles of pitch discolor and disfigure the paper. These products are taken off line and sent to a broke treatment area where effort is made to rehabilitate the paper surface properties by a repulping technique. The material, which is now resent to the pulping station, is called broke. It has been defined as a body of fibrous material which is returned for reuse in a paper making operation and comprises usually the waste or trimmings from the formed web. Due to the fact that the paper has been starched originally in the first run, it contains a high amount of starch. This starch is to a greater or lesser extent soluble in the broke and separates from the fibers. If the liquid is then sent to sewage, the presence of the starch gives rise to a high and undesirable BOD.

Starches used in the paper industry for internal sizing, surface sizing and coating, contribute to the pollution of waste water. In the surface sizing and coating area, an oxidized starch is generally chosen because of its lower viscosity, allowing the starch to penetrate into the paper. However, not all paper made leaves the paper mill. Paper that does not meet the requirements, or paper damaged in operations is salvaged and reused in new furnishes. The term "broke" means unfinished or finished paper that does not leave the machine room as saleable paper. In repulping the broke containing the oxidized starch, it is noted that an oxidized starch ruined saveall efficiency and decreased filler retention.

One purpose of the present invention is to a great extent to make less soluble the starch values attached to the fibers and/or web in the broke so that the BOD may be reduced.

PRIOR ART STATEMENT

U.S. Pat. No. 4,029,885 Buikema (Nalco)—Sizing paper and other cellulose material with a reaction product of starch and a condensate of epichlorohydrin with dimethylamine in which 30% molar ammonia may be substituted for a like amount of dimethylamine. At column 7 it is noted that the starch release rates were lower using the varying amounts of epi-DMA-NH$_3$ condensate as shown also in Table 1.

The patent to Buikema above shows as a treating agent the polymer epi-DMA-NH$_3$ which gave satisfactory results. It has now been found that the addition of a second polymer gives increased recovery of starch as well as improved retention during the repulping of broke. Thus, starch from the broke is recovered in the paper making operation rather than being dissolved and lost in the mill effluent.

In a typical paper making process, the amount of dosage based on dry weight of starch (T) ranges from 2–35 lbs/T of the DMA-epichlorohydrin polymer product (48% polymer, 0.96–16.8 lbs/T polymer) and 0.5–8 lbs/T based on the second polymer product (28% polymer, 0.14–2.24 lbs/T polymer) selected from the group consisting of copolymers of acrylamide/acrylic acid; copolymers of acrylamide/alkali metal acrylate (e.g., sodium acrylate); copolymers of acrylamide/dimethylamino ethyl methacrylate dimethyl sulfate quaternary (DMAEM.DMS quat). The polymers are used in the broke slurry and the pH may be adjusted to pH values from 4.5–9.0, with preferred values of 4.5–7.0 pH.

It has been found that the dual polymer system employing as a first polymer DMA-epichlorohydrin, together with a second polymer selected from the group consisting of a copolymer of acrylamide/acrylic acid; acrylamide/alkali metal acrylate (e.g., sodium acrylate); acrylamide/dimethylamino ethyl methacrylate dimethyl sulfate quaternary (DMAEM.DMS quat), showed better soluble starch reduction and improved retention than did DMA-epichlorohydrin by itself. Among those favored polymers which act as a second polymer or supplement to DMA-epichlorohydrin are the following which are selected from both cationic and anionic polymers:

(1) a copolymer of acrylamide/sodium acrylate which is a water-in-oil emulsion which contains 28% copolymer and contains from 5% to 30% acrylic acid;

(2) a copolymer of 50% acrylamide and 50% acrylic acid which is a water-in-oil emulsion which contains 28% copolymer;

(3) N,N-dimethylamino ethyl methacrylate dimethyl sulfate/polyacrylamide quaternary which is a water-in-oil emulsion containing about 28% copolymer;

(4) N,N-dimethylaminomethyl/acrylamide/acrylamide which is a Mannich reaction product and contains about 5% solids in aqueous solution and contains 0–25% acrylamide.

The above treating agents, which are prepared in a water-in-oil emulsion form, are readily and conveniently inverted to an oil-in-water emulsion in water solution.

In the above, the molecular weight ranges from $4$–$15 \times 10^6$. The most preferred combination is that of the DMA-epichlorohydrin plus acrylamide/sodium acrylate 5% acrylic acid. The basic polymer is described more fully in U.S. Pat. No. 4,029,885 noted above and incorporated here by reference. This polymer is a DMA-epichlorohydrin condensate polymer and is a condensate of epichlorohydrin with an equimolar quantity of dimethylamine in which 30% of molar ammonia may be substituted for a like molar amount of dimethylamine. In this application both polymers may be referred to as DMA-epichlorohydrin.

GENERALIZED PROCEDURE

Repulp Broke Studies (Synthetic)

Stock used throughout the test was the standard polymer test stock with a 100 second Williams Freeness.
30% softwood kraft (bleached)
40% hardwood kraft (bleached)
30% sulfite (bleached)

Slurry Procedure

Standard polymer test stock was used in the broke repulp studies. 248 gms of wet pulp was weighed and diluted with Chicago tap water to a total of 1500 ml and poured into the disintegrator for five minutes (the amount of wet pulp needed varied with each new pulp stock used). The slurry remained at 4% consistency throughout the studies. The slurry was then poured into a 2-liter plastic beaker. 100 lbs/ton of starch was added to the thick stock using a six blade prop with maximum Rheostat setting. Contact time for the starch was 3 minutes. The following materials were used as additives to the pulp stock.

pH Adjustments

The thick stock was divided into 5 (300 ml) portions. The pH was adjusted on the individual 300 ml slurries with 1 N HCl or 1 N NaOH.

Alum Addition

The thick stock was divided into 5 (300 ml) portions. The pH of the individual sample was adjusted with alum. A three blade prop was used for good mixing. (Alum was made up at 2% product for testing.)

Alum and Sodium Aluminate

The thick stock was divided into 5 (300 ml) portions. The pH of the sample was adjusted to a specific pH with alum and readjusted upward with sodium aluminate. (Sodium aluminate was made up at 2% product.)

DMA-epichlorohydrin Polymer Addition

The thick stock was divided into 5 (300 ml) portions. Each sample was marked to indicate the dosage of DMA-epichlorohydrin polymer. The following formula was used to calculate the dosages:

$$\frac{\text{lbs/T} \times \text{ml slurry} \times \text{consistency slurry (\%)}}{2000 \text{ lbs/T} \times \text{concentration of polymer (\%)}}$$

The amount needed for each dosage of DMA-epichlorohydrin was added to the individual portions with a 3-minute contact time. pH adjustments were made using either 1 N HCl or 1 N NaOH allowing 5 minutes of mixing for equilibration.

Second Polymer Addition

DMA-epichlorohydrin was added immediately following the starch with a 3-minute contact time. The slurry was then divided into 5 (300 ml) portions. Each sample was marked indicating the dosage of the second polymer. The samples were individually dosed with the second polymer. The sample was mixed using a three-blade prop and a 3-minute contact time. pH adjustments were the same as in DMA-epichlorohydrin addition. The formula used in calculating each polymer dosage was the same formula as shown previously.

Testing Procedure

Each of the 300 ml samples were divided into 2 equal portions for the following tests:

(1) Soluble starch—The slurry was suction filtered through #40 Whatman filter paper and followed a standard procedure for the determination of starch utilizing the color change of iodine when reacted with free starch.

(2) Charge determination—85 gms of the slurry was weighed in a 100 ml centrifuge tube and centrifuged for 20 minutes at full speed. The standard procedure for the charge determination test was followed with the omission of the pH adjustment step.

RETENTION STUDIES

Slurry Preparations

The slurry make up was the standard slurry used in activity testing without clay, alum, TiO$_2$ and rosin. The only additive used was the equivalent of 100 lbs/T of cooked oxidized starch added to the thick stock with a 15-minute mixing time. The starch was mixed using a six-blade prop at a maximum rheostat setting. The thick stock was poured into a large metal bucket and diluted to 20 liters with Chicago tap water. Several pH adjustments were made throughout the activity testing, allowing for an equilibration time of 30 minutes before resumption back to activity testing.

Sample Preparation

All samples were prepared prior to testing. The following samples were inverted to a given concentration and then diluted to 0.05% product for activity testing:

| Sample | Concentration |
|---|---|
| Polymer A (DMA-epichlorohydrin) | 1% |
| Polymer B (acrylamide/sodium acrylate copolymer 28% concentration and 5% acrylic acid) | 2% |
| Polymer C (acrylamide/sodium acrylate copolymer 28% concentration 30% acrylic acid) | 1% |
| Polymer D (polyacrylamide/DMAEM quaternary; concentration 28%) | 2% |
| Polymer E (50% acrylamide/50% acrylic acid; 28% concentration) | 0.5% |

Activity Testing

The standard Britt jar testing procedure was used to measure the activity of the polymers. The Britt test (K. W. Britt, New York State University) is described in a publication by Nalco Chemical Company dated July 1976. The test essentially is a dynamic jar test which measures drainage rate and final physical properties of a sheet as in a paper machine. Thus, the jar test which operates with a jar and a three-bladed propeller to create shear conditions can be used to measure the activity of a polymer against a blank or compared with another polymer additive for retention or fines study.

In the Britt jar testing procedure a dual polymer program was followed.

Polymer A only
Polymer A + Polymer B
Polymer A + Polymer C
Polymer A + Polymer D
Polymer A + Polymer E

RESULTS

Repulp Studies: Polymer A with Polymer B in a dual polymer program showed the best performance in soluble starch reduction.

Retention Studies: In the dual polymer retention program, Polymer A performed best with Polymer C at both dosage levels of Polymer A.

EXAMPLE 1

Retention of Soluble Starch

Polymer A: (DMA-epichlorohydrin)
Polymer B: (acrylamide/sodium acrylate copolymer; 28% concentration and 5% acrylic acid)
Polymer C: (acrylamide/sodium acrylate copolymer; 28% concentration 30% acrylic acid)
Polymer D: (polyacrylamide/DMA-EM quaternary; concentration 28%)
Polymer E: (50% acrylamide/50% acrylic acid; 28% concentration)

| Polymer/Dosage | Concentration of Soluble Starch | | |
|---|---|---|---|
| | pH 4.5 (ppm) | pH 7.0 (ppm) | pH 9.0 (ppm) |
| Blank-100 lbs/T starch (dry wt.) | 1160 | 1180 | 1180 |
| Polymer A-2 lbs/T | 1080 | 1080 | 1120 |
| 4 lbs/T | 860 | 990 | 960 |
| 6 lbs/T | 720 | 770 | 800 |
| 8 lbs/T | 680 | 740 | 770 |
| 10 lbs/T | 680 | 770 | 770 |

-continued

| Polymer/Dosage | Concentration of Soluble Starch | | |
|---|---|---|---|
| | pH 4.5 (ppm) | pH 7.0 (ppm) | pH 9.0 (ppm) |
| 12 lbs/T | 600 | 600 | 600 |
| 14 lbs/T | 520 | 580 | 560 |
| 16 lbs/T | 500 | 560 | 600 |
| 18 lbs/T | 460 | 520 | 560 |
| 20 lbs/T | 400 | 400 | 440 |
| 22 lbs/T | 380 | 380 | 440 |
| 24 lbs/T | 220 | 260 | 320 |
| 26 lbs/T | 260 | 280 | 300 |
| 28 lbs/T | 260 | 280 | 300 |
| 30 lbs/T | 220 | 260 | 300 |
| 32 lbs/T | 220 | 240 | 300 |
| 35 lbs/T | 160 | 160 | 300 |
| Polymer A 6 lbs/T + | | | |
| Polymer B .5 lbs/T | 560 | 440 | 600 |
| 1 lb/T | 500 | 440 | |
| 2 lbs/T | 400 | 340 | |
| 4 lbs/T | 340 | 320 | |
| 8 lbs/T | 300 | 280 | |
| Polymer A 12 lbs/T + | | | |
| Polymer B .5 lb/T | 280 | 260 | |
| 1 lb/T | 260 | 220 | |
| 2 lbs/T | 220 | 260 | |
| 4 lbs/T | 220 | 260 | |
| 8 lbs/T | 200 | 200 | |
| Polymer A 20 lbs/T + | | | |
| Polymer B .5 lb/T | 180 | 180 | |
| 1 lb/T | 140 | 140 | |
| 2 lbs/T | 80 | 80 | |
| 4 lbs/T | 120 | 80 | |
| 8 lbs/T | 80 | 80 | |
| Polymer A 6 lbs/T + | | | |
| Polymer C .5 lb/T | 560 | 580 | 640 |
| 1 lb/T | 520 | 580 | 620 |
| 2 lbs/T | 520 | 580 | 600 |
| 4 lbs/T | 520 | 560 | 580 |
| 8 lbs/T | 480 | 520 | 580 |
| Polymer A 12 lbs/T + | | | |
| Polymer C .5 lb/T | 440 | 460 | 500 |
| 1 lb/T | 420 | 450 | 460 |
| 2 lbs/T | 400 | 440 | 420 |
| 4 lbs/T | 360 | 400 | 440 |
| 8 lbs/T | 400 | 400 | 200 |
| Polymer A 20 lbs/T + | | | |
| Polymer C .5 lb/T | 360 | 200 | 260 |
| 1 lb/T | 280 | 260 | 340 |
| 2 lbs/T | 260 | 300 | 300 |
| 4 lbs/T | 200 | 260 | 340 |
| 8 lbs/T | 260 | 300 | 300 |
| Polymer A 6 lbs/T + | | | |
| Polymer D .5 lb/T | 480 | 520 | |
| 1 lb/T | 480 | 480 | |
| 2 lbs/T | 520 | 520 | |
| 4 lbs/T | 480 | 520 | |
| 8 lbs/T | 440 | 500 | |
| Polymer A 12 lbs/T + | | | |
| Polymer D .5 lb/T | 400 | 400 | |
| 1 lb/T | 340 | 360 | |
| 2 lbs/T | 300 | 320 | |
| 4 lbs/T | 260 | 300 | |
| 8 lbs/T | 140 | 200 | |
| Polymer A 20 lbs/T + | | | |
| Polymer D .5 lb/T | 160 | 180 | |
| 1 lb/T | 120 | 180 | |
| 2 lbs/T | 160 | 200 | |
| 4 lbs/T | 120 | 200 | |
| 8 lbs/T | 120 | 120 | |
| Polymer A 6 lbs/T + | | | |
| Polymer E .5 lb/T | | 660 | 660 |
| 1 lb/T | | 580 | 600 |
| 2 lbs/T | | 580 | 600 |
| 4 lbs/T | | 520 | 580 |
| 8 lbs/T | | 500 | 520 |
| Polymer A 12 lbs/T + | | | |
| Polymer E .5 lb/T | | 400 | |
| 1 lb/T | | 400 | |
| 2 lbs/T | | 300 | |
| 4 lbs/T | | 300 | |
| 8 lbs/T | | 300 | |
| Polymer A 20 lbs/T + | | | |
| Polymer E .5 lb/T | | 260 | |
| 1 lb/T | | 260 | |
| 2 lbs/T | | 260 | |
| 4 lbs/T | | 260 | |
| 8 lbs/T | | 220 | |

In general it will be noted that for comparable amounts per ton in the dual system as versus the single polymer system, the results are generally lower showing less soluble starch and thus better results. Operating at an acid pH of 4.5 or a neutral pH of 7.0 appears to give slightly better values for soluble starch than where the operation is carried out at a slightly alkaline pH of 9.0. Further, tests showing combination or dual polymer treatment involving usually a majority amount of Polymer A range from 6-20 lbs/ton together with an additive amount of Polymers B, C, D, and E. For the same number of lbs/ton at pH's of 4.5 and 7.0, the utilization of the dual polymer system in the case of Polymer B gave strikingly decreased starch. It would further appear that the results as to Polymer B as an additive to the basic Polymer A were superior to Polymer C when measured at a pH of 4.5 and 7.0. The cationic Polymer D utilized as an additive gave good results both at pH 4.5 and 7.0 at higher values for the additive, such as 20 lbs/ton of Polymer A resulted in 400 ppm and 8 lbs/ton of Polymer D added to 12 lbs/ton of Polymer A resulted in 140 ppm and 200 ppm at pH 4.5 and 7.0, respectively. Polymer E was tested only at pH 7.0 and 9.0. The utilization of this anionic polymer showed some advantage both at pH 9.0 and 7.0. In the mid-range lbs/ton additive of both Polymer A and Polymer E, the Polymer E seemed to be most active. For example, utilizing 14 lbs/ton of Polymer A at pH 7.0 resulted in 580 ppm, whereas utilizing 12 lbs/ton of Polymer A with 2 lbs/ton of Polymer E resulted in 300 ppm of soluble starch.

The polymers in the example are calculated as product weight. Thus, for Polymer A DMA-epi (48% polymer), the range 6-20 lbs/T utilized is equivalent to 2.9-9.6 lbs/T polymer weight. Additionally, the weights for Polymers B, C, D, and E for true polymer weight must be multiplied by the factor of 0.28 for these emulsion polymers.

We claim:

1. A method of increasing the amount of retention of deposited starch and pigment on fibers in broke liquid which consists of adding to said liquid a combination dosage of a dimethylamine-epichlorohydrin polymer together with a second polymer selected from a group consisting of copolymers of acrylamide with (1) acrylic acid, (2) sodium acrylate, (3) dimethylamino ethyl methacrylate quaternary salt wherein the dosage to broke liquid is 0.96-16.8 lbs/ton of the dimethylamine epichlorohydrin polymer together with 0.14-2.24 lbs/ton of acrylamide copolymer, both dosages being based on dry weight of starch.

2. The method of claim 1 wherein the quaternary salt is dimethyl sulfate.

3. The method of claim 1 wherein the starch is oxidized starch.

4. The method of claim 1 wherein said second polymer is a copolymer of acrylamide/sodium acrylate which is a water-in-oil emulsion containing about 28% copolymer and contains from 5% to 30% acrylic acid.

5. The method of claim 1 wherein said polymer is a copolymer of 50% acrylamide and 50% acrylic acid which is a water-in-oil emulsion containing about 28% copolymer.

6. The method of claim 1 wherein said second polymer is a copolymer of polyacrylamide/dimethylamino ethyl methacrylate quaternary which is a water-in-oil emulsion containing about 28% copolymer.

* * * * *